UNITED STATES PATENT OFFICE.

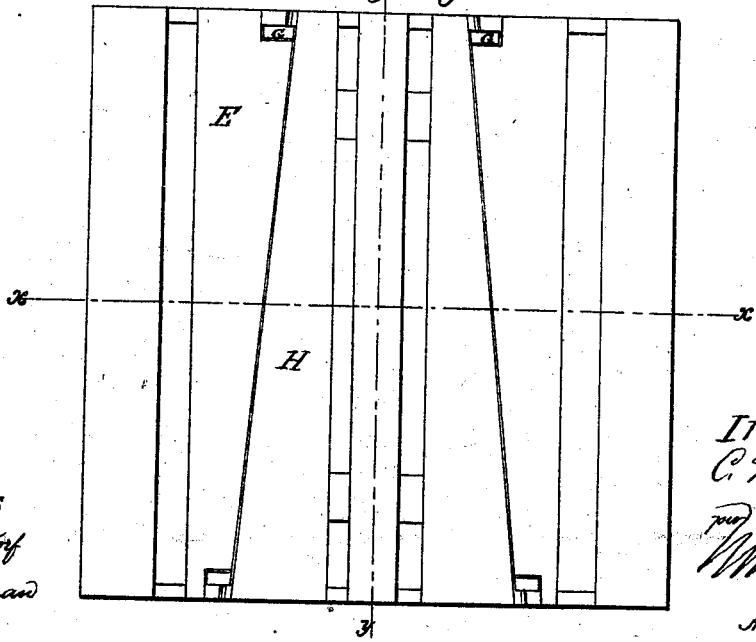

GEORGE M. FENLEY, OF MEDORA, INDIANA.

IMPROVEMENT IN FRUIT-CRATES.

Specification forming part of Letters Patent No. 93,693, dated August 17, 1869.

*To all whom it may concern:*

Be it known that I, GEORGE M. FENLEY, of Medora, in the county of Jackson and State of Indiana, have invented a new and Improved Fruit-Box; and I do hereby declare that the following is a full, clear, and exact description thereof, which will enable others skilled in the art to make and use the same, reference being had to the accompanying drawings, forming part of this specification.

The present invention relates to a new and useful improvement in the construction of a fruit-box for transporting berries, &c., to market.

The improvement consists in providing the cover of the box, having flanges fitting over the hinged side pieces, with spring-catches and a wedge-shaped piece, whereby the same is readily secured to the sides and locked in that position, as will be hereinafter described.

Figure 1 represents a section of the box through the line $xx$. Fig. 2 is a section through the line $yy$. Fig. 3 is a plan of the same.

Similar letters of reference indicate corresponding parts.

The box is constructed of wooden slats A, the sides, ends, top, and bottom being made separate from each other and hinged together, so that the whole box may be folded up flat for transportation or when not in use. The slats A are mortised and nailed to their respective uprights and ends A'. The sides B B are hinged to the bottom C of the box so as to fold inward and lie flat on the bottom C, and the ends D D are hinged to a strip of sufficient height, attached to the bottom, which will allow the said ends to fold inward and lie flat on top of the aforesaid sides B. The sides and ends being thus folded flat on the bottom of the box, the cover E fits over the whole, and holds itself firm against the bottom by the spring-catches F F. This represents the fruit box folded up for transportation or storing away during winter months. In order to use the same as a fruit-box the sides and ends are turned upward, and the cover or cap E placed on top of the sides and ends. The upright strips A' on the sides B B are made with a tongue or key, G, which fits in a corresponding mortise in the cover or cap, E, which will keep the said sides stiff. The ends D D fold up against the ends of the sides B B, and are locked to the cover or cap E by the spring-catches F F. In the center of the cover or cap E there is a wedge-shaped slide, H, which serves as a key to hold the box together, the said slide wedging against the ends of the uprights, serving to hold them in their place. This wedge-shaped slide is held locked in its position by the spring-catch I.

Having thus described my invention, what I claim as new, and desire to secure by Letters Patent, is—

The wedge-shaped slide H, and spring-catches I and F, combined with the cover or cap E, and hinged parts A A' and B and D of a fruit-box, all constructed and arranged to operate as set forth.

The above specification of my invention signed by me this 10th day of May, 1869.

GEORGE M. FENLEY.

Witnesses:
M. W. TANNER,
LEWIS W. HOLMES.